June 25, 1935.   C. A. PETERSEN ET AL   2,005,954
FOOT VALVE
Filed May 27, 1932
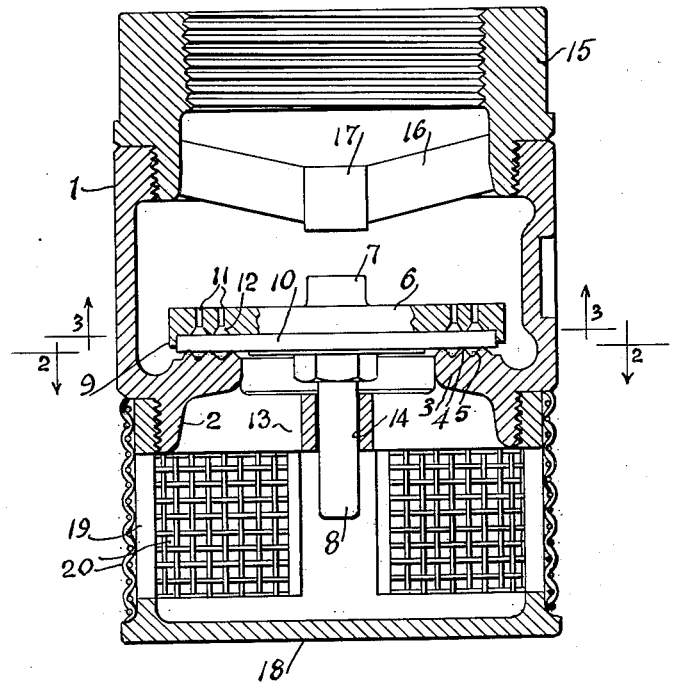
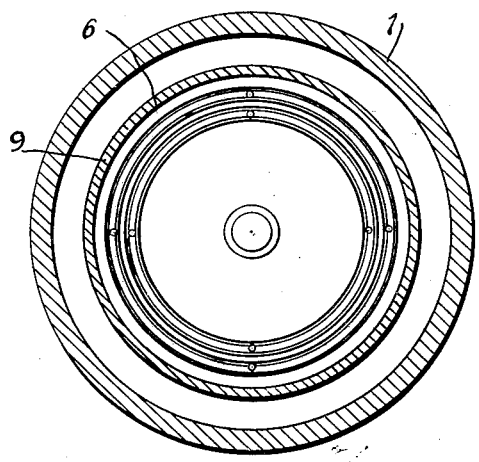
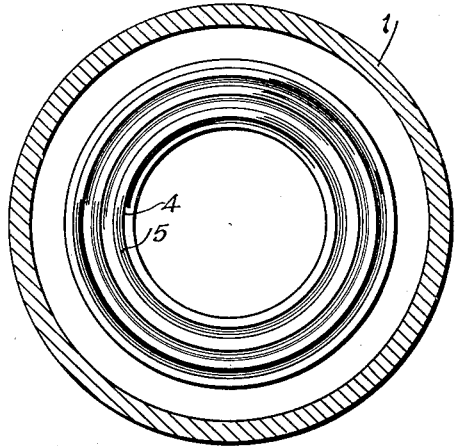
Inventors
CARL A. PETERSEN,
ANKER L. CHRISTY,
BY Toulmin & Toulmin
Attorneys Patented June 25, 1935

2,005,954

UNITED STATES PATENT OFFICE 2,005,954

FOOT VALVE

Carl A. Petersen and Anker L. Christy, Chicago, Ill.

Application May 27, 1932, Serial No. 613,976

7 Claims. (Cl. 251—127)

This invention relates to improvements in foot valves, and has for its object to provide in a foot valve structure, a valve and valve seat which has on the valve-engaging surface a plurality of concentrically arranged ribs or ledges to provide a plurality of contacting surfaces for producing a close fit between the valve and the valve seat.

It is also an object of this invention to provide, in connection with a valve seat, a valve composed of an upper rigid member and a lower yielding, resilient member adapted to engage the valve seat when the valve structure is in closing position.

It is also an object of this invention to provide a valve structure composed of two disc elements engaging each other. In one of these elements, adjacent the other, is a plurality of concentrically arranged series of pockets and a hole through the disc element leading to each pocket to provide fluid pressure between the two valve elements so that the valve element in which the pockets are not located is more securely pressed against the seat.

These and other advantages will appear from the following description taken in connection with the drawing.

Referring to the drawing:

Figure 1 is a longitudinal section through the valve casing, showing the nature of the valve seat and the valve engaging the seat.

Figure 2 is a section on the line 2—2 of Figure 1.

Figure 3 is a section on the line 3—3 of Figure 1.

As shown in Figure 1, there is a casing 1, cylindrical in shape, and having one end 2 reduced and externally threaded. Adjacent this reduced end is an annular ledge 3, which forms a valve seat. Around this ledge and around the passageway formed by the casing is a plurality of annular ridges or ribs 4, forming between adjacent ribs or ridges annular depressions 5. The purpose of these ribs is to form a plurality of contacting, circular lines in cooperation with a valve member adapted to rest upon and be seated on the ribs.

This valve member is composed of two elements, an upper metal valve plate or disc 6, which has extending upwardly from the center thereof, a boss 7, and extending from the other side of this disc or plate, in a direction opposite to the boss, is a pin 8 for guiding the valve as it moves to and from the seat. Around the periphery of the valve or disc, and extending downwardly from the edge thereof, is a flange 9 which forms, with the body of the disc or plate, a seat for a sealing disc 10 composed of some yielding material, such as a suitable metal, rubber, fiber or the like. When the sealing disc is seated the two elements are in the position shown in Figure 1. Arranged concentrically around the under surface of the valve plate or disc, and adjacent the periphery thereof, is a plurality of concentrically arranged holes 11, which lead into V-shaped annular enlargements or pockets 12 on the under side of the disc adjacent the sealing disc. The relative arrangement of these holes and pockets is shown in Figure 3.

These holes and pockets are arranged in concentric series so that the holes of each series are positioned above one of the depressions in the valve seat when the valve is seated thereon, as clearly shown in Figure 1. These holes and pockets of each series are so closely arranged that when the valve is seated pressure on the yielding disc exerted through these holes will cause pressure to be applied to the yielding disc in a line substantially around the seat, over the depressions, thereby firmly and securely pressing the sealing disc upon the seat and the ribs thereon.

For the purpose of guiding and properly seating the valve members there is provided adjacent the reduced end of the casing a spider 13, which has a hole 14 through which the pin 8 passes and works. On the end of the casing, remote from the reduced end, there is a connection 15 threaded into the end of the casing. This connection has therein a spider 16, which has thereon a central hub 17 adapted to be engaged by the boss 7 for limiting the upward or unseating movement of the valve.

On the reduced end of the casing is threaded a cap member 18, which has in its periphery a plurality of openings 19. Around the periphery of this cap is a wire strainer 20. This strainer is for the purpose of removing foreign matter from whatever fluid may be carried through the passageway formed by the casing. The entrance to the casing is through the wire strainer. The exit or outlet is through the connection 15.

Whenever suction is applied to the connection end of the casing the fluid or liquid, whatever the material pumped may be, is drawn through the passageway formed by the casing and surrounded by the ledge. After the fluid or liquid has passed through the casing, backward movement of the fluid or liquid is prevented by the seating of the valve on its seat, and the nature of the valve and the nature of the seat form a secure seal between the two so that air or gases or liquids cannot pass back through the casing.

It will be understood that we desire to comprehend within our invention such modifications as come within the scope of our claims and our invention.

Having thus fully described our invention, what we claim as new and desire to secure by Letters Patent, is:

1. In a foot valve mechanism, a casing having a passageway therethrough, a ledge in the casing around the passageway, said ledge having a plurality of ribs around the passageway, and a valve consisting of a metal disc and a resilient disc adapted to engage the ribs for closing the passageway, said metal disc having holes therein for admitting pressure fluid on the resilient disc between the ribs.

2. In a foot valve mechanism, a casing having a passageway therethrough, a ledge in the casing around the passageway, said ledge having a plurality of ribs around the passageway, a resilient disc adapted to engage the ribs, and a second disc on the resilient disc, said second disc having pockets and holes leading thereto adjacent the resilient disc for applying fluid pressure to the resilient disc between the ribs.

3. In a foot valve mechanism, a casing having a passageway therethrough, a valve seat around the passageway, said valve seat having a plurality of concentrically arranged ribs around the passageway, a valve member consisting of a disc having a peripheral flange and a pin projecting from one side and a second disc of soft material on the first disc engaged by the flange and adapted to engage the ribs said flange extending beyond said second disc and aligning the second disc with the first disc, and a guide member engaging the pin, said first named disc having a plurality of marginal holes.

4. In a foot valve mechanism, a casing having a passageway therethrough, a valve seat comprising a plurality of concentrically arranged ribs around the passageway, a yielding element adapted to engage the ribs, and a rigid element on the yielding element for giving it form and guiding it, said rigid element having adjacent the yielding element a plurality of circular pockets and a hole leading to each pocket, said pockets being arranged in a plurality of concentric circles.

5. In a new article of manufacture for use as a valve comprising a plate and stem, ports through said plate, a groove in said plate communicating with the ports, and a resilient plate mounted over said groove beneath and within the margin of said first plate, the marginal area of the resilient plate being held down by the first plate, and a grooved seat for said resilient plate.

6. In a foot valve mechanism, a casing having a passageway therethrough, a valve seat comprising a plurality of ribs around the passageway, and a valve consisting of a metal disc and a resilient disc adapted to engage the ribs for closing the passageway, said metal disc having holes therein for admitting pressure fluid to the resilient disc above the ribs.

7. In a foot valve mechanism, a casing having a passageway therethrough, a valve seat comprising a plurality of concentrically arranged ribs around the passageway, a yielding element adapted to engage the ribs, and a rigid element on the yielding element for giving it form and guiding it, said rigid element having adjacent the yielding element a circular pocket overlying the seat ribs, and a hole leading to said pocket.

CARL A. PETERSEN.
ANKER L. CHRISTY.